(12) United States Patent
Sogani et al.

(10) Patent No.: US 9,684,729 B2
(45) Date of Patent: Jun. 20, 2017

(54) DISPLAYING SEARCH RESULTS ON A USER DEVICE USING A LAYOUT FILE

(71) Applicant: Quixey, Inc., Mountain View, CA (US)

(72) Inventors: Shravan Sogani, San Ramon, CA (US); Leigh Klotz, Palo Alto, CA (US); Chee Wong, Mountain View, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 14/452,276

(22) Filed: Aug. 5, 2014

(65) Prior Publication Data

US 2015/0379136 A1 Dec. 31, 2015

Related U.S. Application Data

(60) Provisional application No. 62/018,928, filed on Jun. 30, 2014.

(51) Int. Cl.
*G06F 17/21* (2006.01)
*G06F 17/30* (2006.01)

(52) U.S. Cl.
CPC .. *G06F 17/30876* (2013.01); *G06F 17/30696* (2013.01)

(58) Field of Classification Search
CPC ......... G06F 17/30861; G06F 17/30864; G06F 17/30651; G06F 17/30867; G06F 17/30882; G06F 17/30905; G06F 17/30386; G06F 17/3089; G06F 17/3064; G06F 17/3097
See application file for complete search history.

(56) References Cited

U.S. PATENT DOCUMENTS

| 8,386,455 | B2 | 2/2013 | Basu et al. |
| 2008/0086368 | A1* | 4/2008 | Bauman ................. G06Q 30/02 705/7.34 |
| 2010/0115396 | A1 | 5/2010 | Byron et al. |
| 2010/0332493 | A1* | 12/2010 | Haas ................... G06F 17/3064 707/759 |
| 2012/0102386 | A1 | 4/2012 | Campbell et al. |
| 2012/0124062 | A1* | 5/2012 | Macbeth ................ G06F 9/445 707/749 |

(Continued)

OTHER PUBLICATIONS

International Search Report and Written Opinion for related WO Application No. PCT/US2015/036009, dated Sep. 22, 2015.

*Primary Examiner* — Ariel Mercado
(74) *Attorney, Agent, or Firm* — Harness, Dickey & Pierce, P.L.C.

(57) ABSTRACT

A method for displaying search results on a user device using a layout file includes receiving search results containing one or more result objects. Each result object includes a layout identifier, an access mechanism used to access a state of an application, and result data. For each result object the method includes retrieving a layout file of a plurality of layout files from a storage device based on the layout identifier, obtaining content based on the result data, and generating the user selectable link based on the access mechanism, the layout file, and the content. The layout file defines a template that is used to generate a user selectable link and corresponds to the application referenced by the one or more access mechanisms. The method further includes generating displayable search results using the generated user selectable links and providing, by the processing device, the displayable search results for display.

15 Claims, 9 Drawing Sheets

(56) References Cited

U.S. PATENT DOCUMENTS

| | | |
|---|---|---|
| 2012/0215755 A1 | 8/2012 | Kumar et al. |
| 2012/0284247 A1 | 11/2012 | Jiang et al. |
| 2013/0007587 A1* | 1/2013 | Marantz et al. .............. 715/234 |
| 2013/0174014 A1* | 7/2013 | Kwan et al. .................. 715/234 |
| 2014/0258013 A1* | 9/2014 | Collins et al. ............... 705/26.3 |
| 2015/0095145 A1* | 4/2015 | Shulman ............ G06Q 30/0241 |
| | | 715/234 |

* cited by examiner

DISPLAYING SEARCH RESULTS ON A USER DEVICE USING A LAYOUT FILE

CROSS REFERENCE TO RELATED APPLICATIONS

This U.S. patent application claims priority under 35 U.S.C. §119(e) to U.S. Provisional Application 62/018,928, filed on Jun. 30, 2014, which is hereby incorporated by reference in its entirety.

TECHNICAL FIELD

This disclosure relates to techniques for displaying search results on a user device.

BACKGROUND

Search engine users want search results that are relevant and informative. Informative search results are search results that help the user determine whether to click on a user selectable link to access a resource referenced by an access mechanism (e.g., a URL) contained in the link. For example, a search result that only provided a name of the resource, with nothing else, would not help the user make an informed decision. Most likely, the user will disregard the result and will select away more informative result. This is detrimental to a resource provider and, potentially the user, as the user may wind up accessing a less relevant resource.

SUMMARY

One aspect of the disclosure provides a method for displaying search results on a user device using a layout file. The method includes receiving search results containing one or more result objects. Each result object includes a layout identifier, an access mechanism used to access a state of an application, and result data. For each result object the method includes retrieving a layout file of a plurality of layout files from a storage device based on the layout identifier, obtaining content based on the result data, and generating the user selectable link based on the access mechanism, the layout file, and the content. The layout file defines a template that is used to generate a user selectable link and corresponds to the application referenced by the one or more access mechanisms. The method further includes generating displayable search results using the generated user selectable links and providing, by the processing device, the displayable search results for display.

According to some implementations of the present disclosure the plurality of layout files are custom layout files provided by application providers. An application provider may provide a layout file with application data of a respective application. Additionally or alternatively, an application provider may provide a layout file to a search engine, which provides the layout file before providing the search results. In some implementations, the layout files include a layout object and a binding. In these implementations, generating the user selectable link includes instantiating an instance of the layout object and binding the content and the access mechanisms to the layout object using the binding.

According to some implementations of the present disclosure obtaining the content includes parsing the result object to identify the content. Additionally, or alternatively, obtaining the content includes parsing the result object to identify an address of a resource, requesting the content from the resource using the address, and receiving the content.

In another aspect of the present disclosure, a user device includes a storage device that stores a plurality of layout files and a processing device that executes computer readable instructions. The computer readable instructions, when executed by the processing device, cause the processing device to receive search results containing one or more result objects. Each result object includes a layout identifier, an access mechanism used to access a state of an application, and result data. For each result object, the computer readable instructions cause the processing device to retrieve a layout file from the storage device based on the layout identifier, obtain content based on the result data, and generate the user selectable link based on the access mechanism, the layout file, and the content. The layout file defines a template that is used to generate a user selectable link and corresponding to the application referenced by the one or more access mechanisms. The computer readable instructions cause the processing device to generate displayable search results using the generated user selectable links and to output the displayable search results to a user interface of the user device.

According to some implementations of the present disclosure, the layout files are custom layout files provided by application providers. An application provider may provide a layout file with application data of a respective application. Additionally or alternatively, an application provider may provide a layout file to a search engine, which provides the layout file before providing the search results. In some implementations the layout files include a layout object and a binding. In these implementations, generating the user selectable link includes instantiating an instance of the layout object and binding the content and the access mechanisms to the layout object using the binding.

According to some implementations of the present disclosure, obtaining the content includes parsing the result object to identify the content. Additionally or alternatively, obtaining the content includes parsing the result object to identify an address of a resource, requesting the content from the resource using the address, and receiving the content.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
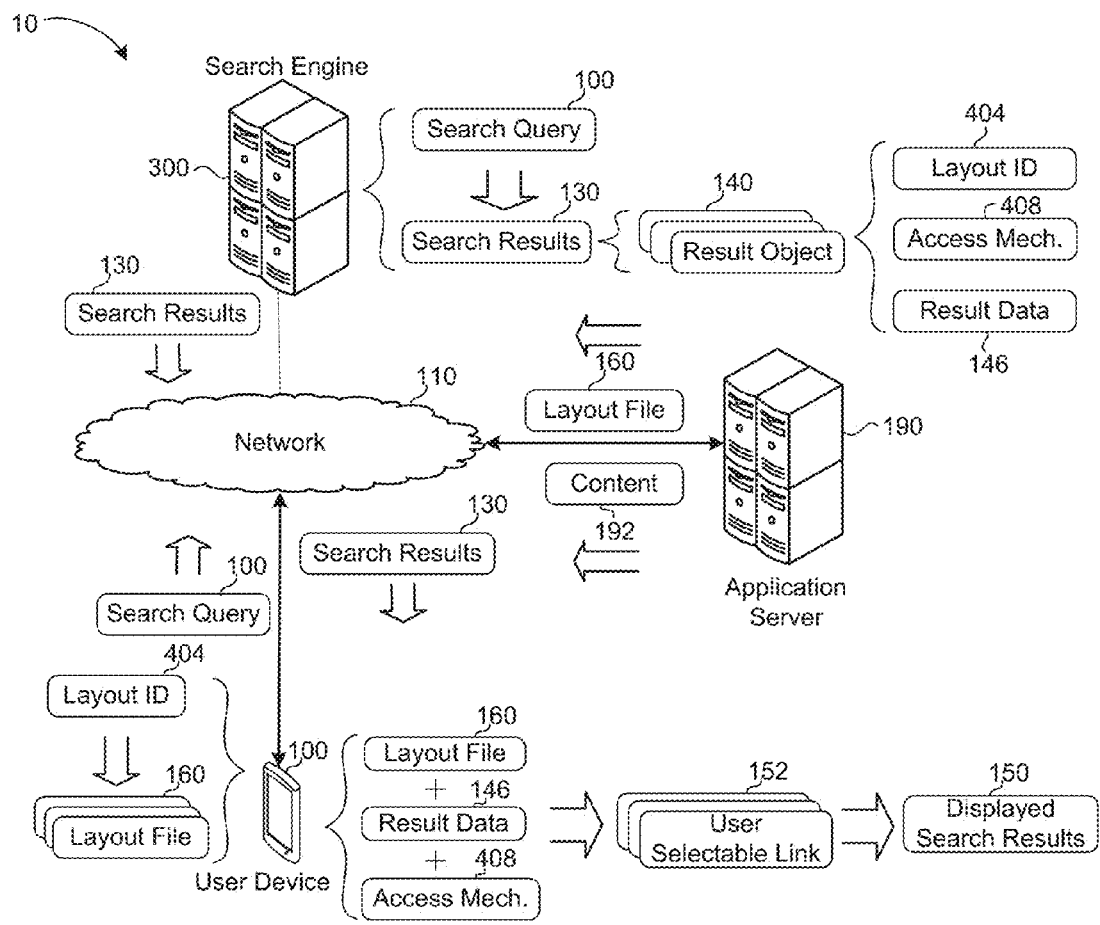
FIG. 1A is a schematic view illustrating an example environment of a search engine that receives search queries from user devices.

FIG. 1A illustrates an example environment 10 of a search engine 300. A search engine 300 is a system of one or more computing devices that receives search queries 100 from user devices 200 via a network 110. While the user device 200 is depicted as a smartphone, a user device 200 can be any suitable user computing device including, but not limited to, a tablet computing device, a personal computing device, a laptop computing device, a gaming device, a vehicle infotainment device, and/or a smart appliance (e.g., smart refrigerator or smart television). The search engine 300 generates search results 130 based on the search query 100 and provides the search results 130 to a requesting user device 200. The user device 200 renders the search results 130 into displayed search results 150, which it displays via a user interface (e.g., a touchscreen or monitor). The displayed search results 150 include user selectable links 152, whereby a user can select a user selectable link 152 (e.g., press or click on the link 152) to access a state or functionality of an application. A user selectable link 152 can include content 192 that is obtained from the application. For example, the search engine 300 may obtain the content 192 by crawling the application or an application server 190 may provide the content 192 to the search engine 300 during a "data dump." In some implementations, the user device 200 requests the content 192 from the application server 190 at rendering time.

The search results 130 include one or more result objects 140. A result object 140 can include one or more access mechanisms 408, a layout ID 404, and result data 146. The user device 200 receives the search results 130 and generates (e.g., renders) displayable search results 150 based on the received search results 130 and one or more layout files 160. The user device 200 can store the layout files 160, such that the transmitted search results 130 are smaller in size. A layout file 160 defines instructions and data for rendering a user selectable link 152. The layout ID identifies a layout file 160 that the user device 200 is to use to generate the user selectable link 152. The user device 200 retrieves the layout file 160 and generates a user selectable link 152 based on the retrieved layout file 160, the one or more access mechanisms 408 identified in the result object 140, and the result data 146 contained in a result object 140. In some scenarios, the result data 146 contains content 192 that is to be included in the user selectable link 152. In other scenarios, the result data 146 identifies a location (e.g., a URL) where the user device 200 can obtain the content that is to be included in the user selectable link 152. For example, the result data 146 may identify the address to access an application programmer interface (API) of an application server 190 to obtain the content 192 from the application server 190. These scenarios may help ensure that the content 192 displayed in the user selectable link 152 is up to date.

Figure 1B:
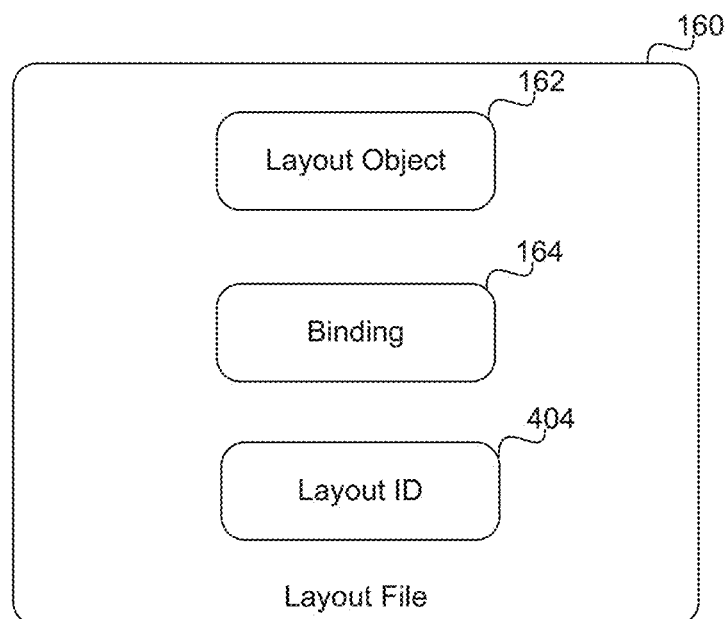
FIG. 1B is a schematic view illustrating an example layout file.

FIG. 1B illustrates an example of a layout file 160. In the illustrated example, the layout file 160 includes a layout object 162 and a binding 164. A layout object 162 can refer to a template or bounding control that defines the elements that can be displayed in the displayed search results 150. A layout object 162 can further include instructions for generating the portion of the displayed search results 150. For example, the layout object 162 can define the data types that it can receive and instructions for generating and displaying a user selectable link 152. In some implementations, the layout object 162 is a class (e.g., a Java class) that the user device 200 instantiates an instance of.

Figure 1C:
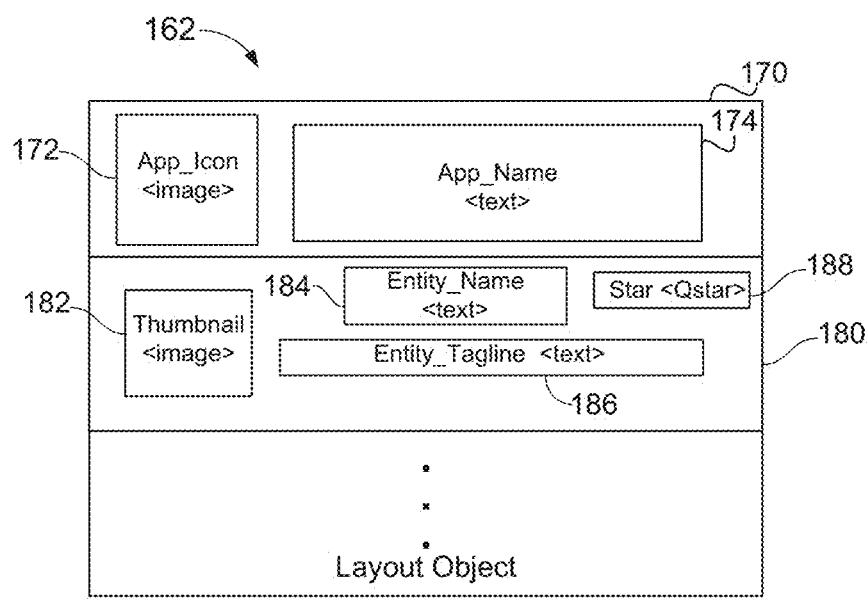
FIG. 1C is a schematic view illustrating an example layout object.

FIG. 1C illustrates an example of a layout object 162. In the illustrated example, the layout object 162 includes a header template 170 and a link template 180. In this example, the header template 170 includes an "app_icon" element 172 and an "app_name" element 1174. According to the example layout object 162, the "app_icon" element 172 receives an image and the "app_name" element 174 receives text. A user device 200 can utilize the header template 170 to generate a header for a set of one or more user selectable links 152. In some implementations, a header can be a user selectable link (e.g., a link to a default state of the application). In other implementations, the header only denotes information regarding the user selectable links 152 displayed in relation to (e.g., beneath) the user selectable link 152. For instance, the header can indicate an application to which the user selectable links 152 displayed in relation thereto correspond.

The link template 180 includes a "thumbnail" element 182 that receives an image, an "entity_name" element 184 that receives text, an "entity_tagline" element 186 that receives text, and a "star" element 188 that receives a custom data type "Qstar." The layout object 162 may define the location of the elements in a header or user selectable link, fonts of different elements, font sizes of different elements, and any other suitable formatting.

Referring back to FIG. 1B, the binding 164 points to the layout object and can define the metadata of the layout object with respect to the actual content. Additionally or alternatively, the binding provides between the content 192 and the layout object 162. In operation, the binding 164 is used to input the values indicated by the content 192 into the templates of the layout object 162. Put another way, the binding is the mechanism by which the content 192 is displayed in the user selectable link 152. Table I below illustrates an example binding 164 and Table II illustrates an example result object 140 (which may be received with one or more other result objects 140 in search results 130) where the binding 164 binds to a layout object 162.

TABLE I

```
{
  "layout":{
    "src":"<Link to the Layout Object>",
    "classpath":"com.quixey.android.extension.AppName.AppLayout"
  },
  "mapping":{
    "image":"resources.dv_content.thumbnail",
    "title_label":"resources.dv_content.name",
    "location_label":"resources.dv_content.city",
    "rating_label": {"path": "resources.dv_content.rating", "type: "integer"}
    "link": { "path": "resources.uri", "format": "uri" }
    ...
  },
  ...
}
```

TABLE II

```
"resources": [
  {
    "dv_content": {
      "rating": 0.82,
      "title": "Amarin Thai Cuisine",
```

TABLE II-continued

```
        "city": "Mountain View,",
        "thumbnail": "http://a4.dinerhunterdn.com/w/s/Jp/tUhax7.jpg"
      },
      "uri":
"http://www.dinerhunter.com/r/6/80281/restaurant./Amarin-Thai-Cuisine-
Mountain-View",
      "resource_binding": {
        "bindings_url": "<Link to Binding Object>",
        "binding_id": "<Binding Unique ID>"
      },
      ...
    },
    {
      ...
    }
  ]
```

The examples provided in Tables I and II are not intended to limit the scope of the disclosure. It is possible to use other declarative features of the JSON Schema, such as pattern for regular expression matching, minLength or maxLength for string validation, or any other such declarations from the JSON Schema that may appear in future Request For Comment (RFC). Furthermore, while use of a .JSON file is described, the result object and binding can be expressed in any other suitable format (e.g., XML or HTML).

In some implementations, the layout files 160 are provided by application providers. In particular, the layout files 160 allow the application providers to define the look and feel of the user selectable links 152 that link to their respective applications. The application providers can define the layout object 162 and/or the binding 164. In some implementations, the application providers provide the layout files 160 to the search engine 300 and the search engine 300 distributes the layout files 160 to the user devices 200. Additionally, or alternatively, the application providers may provide the layout files 160 directly to the user devices 200. For example, the application providers may provide the layout files 160 when the application is downloaded to the user device 200 and/or when the application is updated. In another example, the application provider may provide a layout file 160 at the request of the user device 200. For instance, a result object 140 may include a resource identifier to an application server 190, such that the user device 200 can provide an API request to the application server 190 requesting a layout file 160 and/or content 192. In some scenarios, the layout files 160 are defined by the search engine 300 provider. These layout files 160 may be tailored to specific applications or may be default layouts that can be used in the absence of a layout file 160 specific to an application.

Figure 1D:
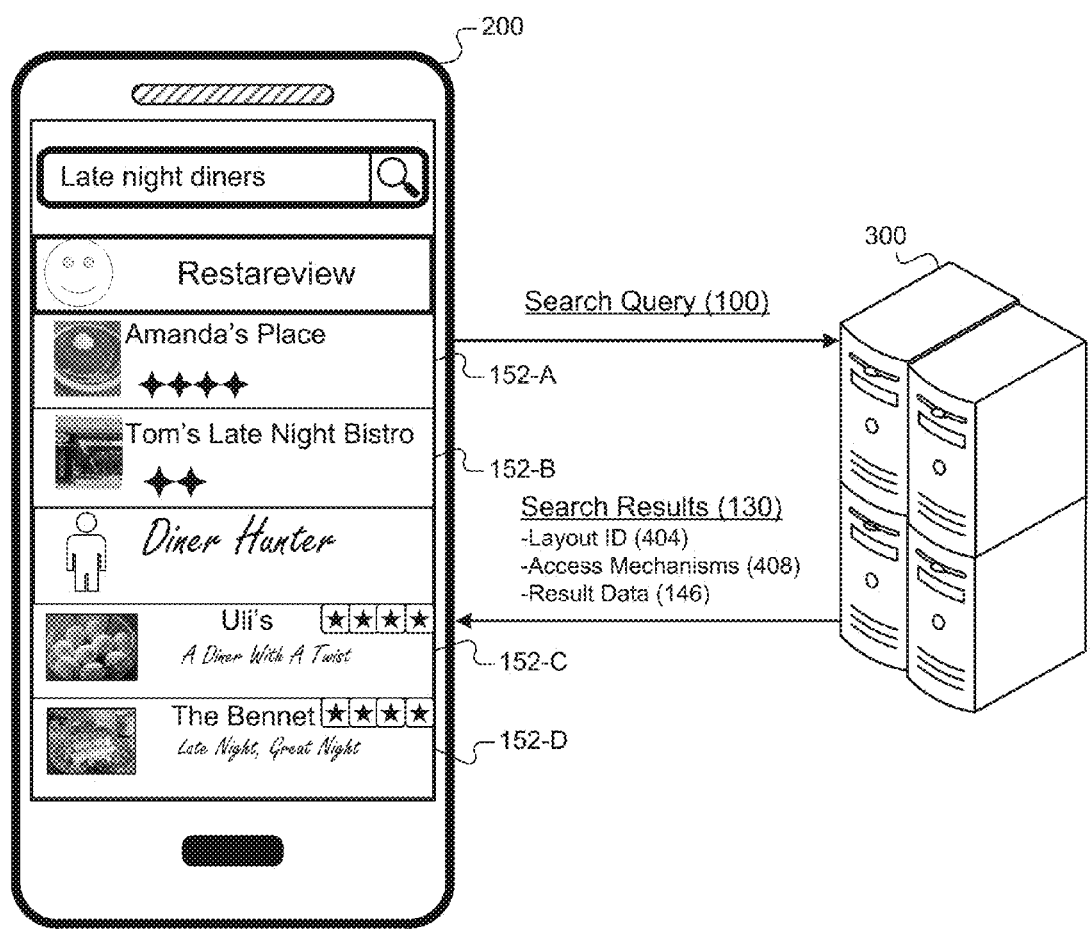
FIG. 1D is a schematic view illustrating a user device displaying search results with customized layouts.

FIG. 1D illustrates an example of a user device 200 displaying displayed search results 150. In the illustrated example, the displayed search results 150 are responsive to the search query 100 "late night diners." In this example, the displayed search results 150 include two user selectable links 152-C, 152-D to the "Diner Hunter" application. These user selectable links 152 may have been generated using the layout object of FIG. 1C. The displayed search results 150 also include user selectable links 152-A, 152-B to the "Restareview" application. As shown, these user selectable links 152-A, 152-B have been generated using a different layout file, as the user selectable links 152-A, 152-B have a different look and feel.

The user selectable links 152 include one or more access mechanisms 408. Access mechanisms 408 may include at least one of a native application access mechanism, (hereinafter "application access mechanism"), a web access mechanism, and an application download mechanism. The user device 200 may use the access mechanisms 408 to access functionality of applications. For example, the user may select a user selectable link 152 including an access mechanism 408 in order to access functionality of an application indicated in the user selectable link 152.

An application access mechanism 408 may be a string that includes a reference to a native application and indicates one or more operations for the user device 200 to perform. If a user selects a user selectable link 152 including an application access mechanism 408, the user device 200 may launch the native application referenced in the application access mechanism and perform the one or more operations indicated in the application access mechanism. A web access mechanism 408 may include a resource identifier that includes a reference to a web resource (e.g., a page of a web application/website). For example, a web access mechanism 408 may include a uniform resource locator (URL) (i.e., a web address) used with hypertext transfer protocol (HTTP). If a user selects a user selectable link 152 including a web access mechanism 408, the user device 200 may launch the web browser application 216 (FIG. 2) and retrieve the web resource indicated in the resource identifier. Put another way, if a user selects a user selectable link 152 including a web access mechanism, the user device 200 may launch a corresponding web browser application 216 and access a state (e.g., a page) of a web application/website. In some examples, web access mechanisms 408 include URLs for mobile-optimized sites and/or full sites. An application download mechanism 408 may indicate a location (e.g., a digital distribution platform) where a native application can be downloaded in the scenario where the native application is not installed on the user device 200. If a user selects a user selectable link 152 including an application download mechanism 408, the user device 200 may access a digital distribution platform from which the referenced native application may be downloaded. The user device 200 may access a digital distribution platform using at least one of the web browser application and one of the native applications.

Figure 2:
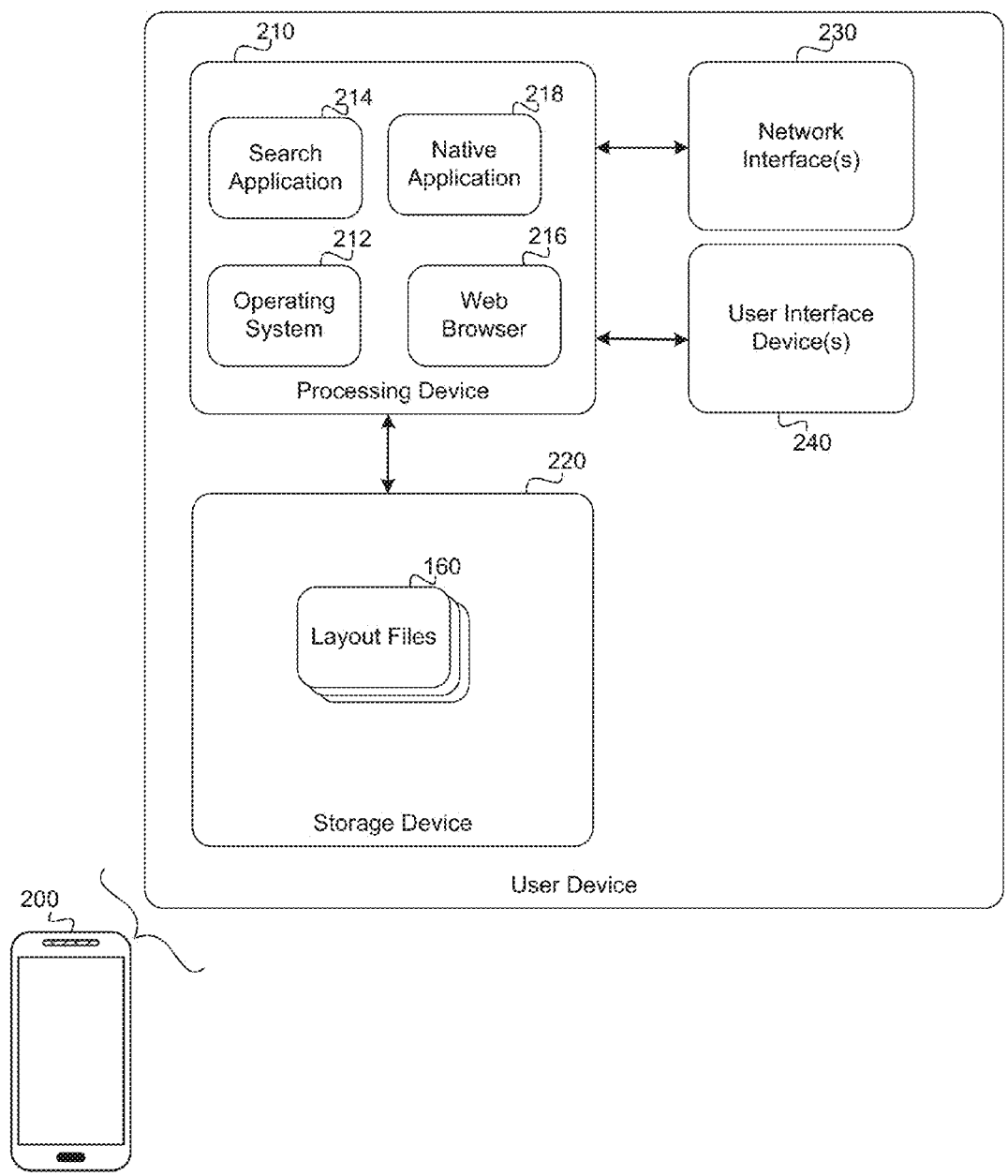
FIG. 2 is a schematic view illustrating example components of a user device.

FIG. 2 illustrates an example user device 200 according to some implementations of the present disclosure. The user device 200 can include a processing device 210, a storage device 220, a network interface device 230, and a user interface 240. The user device 200 may include additional components not shown (e.g., a GPS device, an accelerometer, a camera).

The processing device 210 includes memory (e.g., RAM and/or ROM) that stores computer readable instructions and one or more processors that execute the computer readable instructions. In implementations where the processing device 210 includes two or more processors, the processors can execute in a distributed or individual manner. The processing device 210 can execute an operating system 212, a search application 214, a web browser application 216, and one or more native applications 218. The operating system 212 provides an interface between the search application 214, the web browser 216, and the native applications 218 and the processing device 210.

The storage device 220 includes one or more computer readable mediums (e.g., hard disk drive and/or flash memory). The storage device 220 can store one or more layout files 160. The layout files 160 may be stored with the application data of the search application 214. Each layout file 160 may have a unique layout ID 404 associated therewith. In some implementations, the layout files 160 are stored in a layout file datastore (not shown), whereby the search application 214 can retrieve a layout file 160 using a layout ID. The storage device 220 stores additional data not explicitly shown.

The network interface 230 includes one or more devices that are configured to communicate with the network. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface 240 includes one or more devices that receive input from and/or provide output to a user. The user interface 240 can include, but is not limited to, a touchscreen, a display, a QWERTY keyboard, a numeric keypad, a touchpad, a microphone, and/or speakers.

The search application 214 generates and displays a graphical user interface that allows users to enter search queries 100 and that renders and displays the displayable search results 150 that are responsive to the search queries 100. In operation, the search application 214 receives a search query 100 from a user via a user interface 240. The search application 214 transmits the search query 100 to the search engine 300 via the network interface device 240. In some implementations, the search application 214 generates a query wrapper (not shown) that includes the search query 100 and one or more context parameters (not shown). A context parameter is additional data that the search engine 300 can utilize to determine the search results (e.g., a geolocation of the user device 200, a user, profile identifier, a list of applications installed on the user device 200).

The search application 214 receives search results 130 from the search engine 300 and renders the displayed search results 150 based thereon. In some implementations, the search results 150 are encoded in a .json file (or an analogous format). As previously discussed the search results 130 include one or more result objects 140. Each result object 140 corresponds to a result that is to be included in the displayed search results 150. A result to be included in the displayed search results 150 can refer to either a user selectable link 152 or a header.

In the event of a result object 140 that is used to render a user selectable link 152, the result object 140 can contain one or more access mechanisms 408, a layout ID 404, and result data 146. The result data 146 can include the content 192 that is displayed in the user selectable link 152 or an address where the content 192 may be obtained. Examples of content 192 may be text descriptions of an application state, icons, screenshots of the application state, and data used to populate custom GUI elements that are specific to the application. For instance, if the result object 140 corresponds to a state of a restaurant review application (e.g., a review of a specific restaurant), the result data 146 may include an icon of the application, a number of star ratings of the restaurant, a price rating (e.g., is the restaurant expensive or cheap), and any other information that may be displayed in the user selectable link 152. In the event that the result data 146 does not include the content 192, but rather the result data 146 contains an address where the content 192 can be obtained, the search application 214 can provide an API request to the application server 190 (assuming the application server 190 is referenced by the address).

For each result object 140 in the search results 130 used to generate a user selectable link 152, the search application 214 renders a user selectable link 152 based on the result object 140. In particular, the search application 214 reads the layout ID 404 from the result object 140. The search application 214 then retrieves the layout file 160 from the storage device 220 using the layout ID 404. The search application 214 instantiates the user selectable link 152 from the retrieved layout file 160. In some implementations, the search application 214 instantiates an instance of the layout object 162. In these implementations, the binding 164 binds the content 192 and the access mechanisms 408 to the instantiated layout object. In particular, the binding 164 defines the values that the layout object 162 accepts, so that the instantiated layout object includes elements defined by the binding 164 and indicating the content 192. The result is a user selectable link 152 that links to the resource (e.g., a state or function of an application) referenced by the access mechanism(s) 408. The search application 214 includes the rendered user selectable link 152 in the displayed search results 150. Upon rendering the user selectable link 152 and any other elements defined in the search results 130 or the GUI of the search application 214, the search application presents the displayed search results 150 via the user interface 240.

Figure 3:
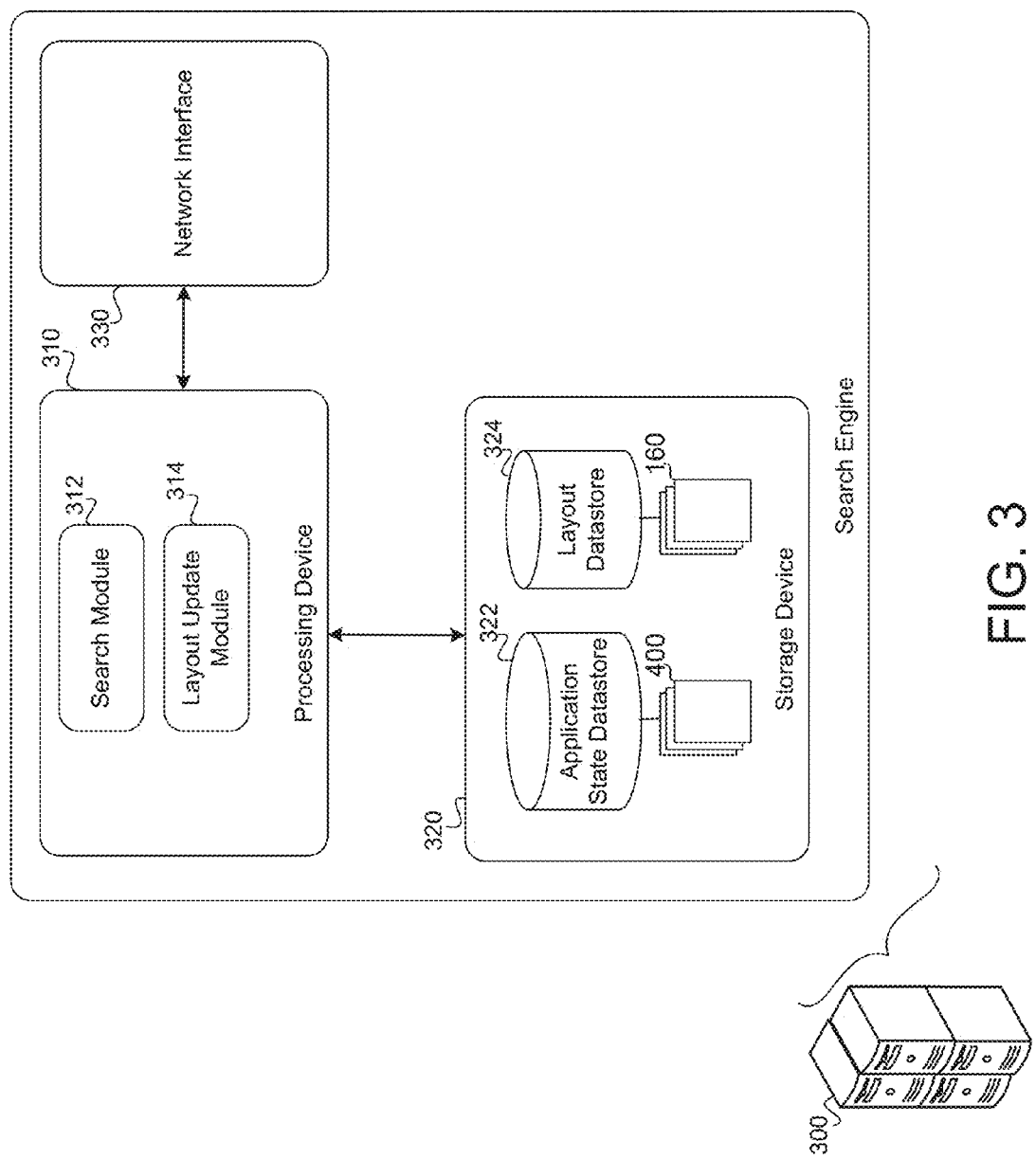
FIG. 3 is a schematic view illustrating example components of a search engine.

FIG. 3 illustrates an example search engine 300. The search engine 300 includes a processing device 310, a storage device 320, and a network interface device 330. The example search engine 300 may include additional components not shown.

The processing device 310 includes one or more physical processors that execute computer-readable instructions (e.g., executable computer code) in communication with a memory device (e.g. RAM and/or ROM) that stores the computer-readable instructions. In implementations where the processing device 310 includes two or more processors, the two or more processors can operate in an individual or distributed manner. The processing device 310 executes a search module 312 and a layout update module 314. In some implementations, some of the executed components are implemented at different physical devices or locations. For instance, the search module 312 may execute at a first location/device and the layout update module 314 may execute at a second location/device.

The network interface device 330 includes one or more devices that can perform wired or wireless (e.g., WiFi or cellular) communication. Examples of the network interface device 330 include, but are not limited to, a transceiver configured to perform communications using the IEEE 802.11 wireless standard, an Ethernet port, a wireless transmitter, and a universal serial bus (USB) port.

The storage device 320 can include one or more computer readable storage mediums (e.g., hard disk drives and/or flash memory drives). The storage mediums can be located at the same physical location or device or at different physical locations or devices. The storage device 320 can store an application state datastore 322 that can store a plurality of application state records 400 (herein referred to as "state records") and a layout datastore 324 that stores a plurality of layout files 160.

The search module 312 performs a search for state records 400 included in the application state datastore 322 in response to the received query wrapper (e.g., search query 100 and geo-location data). In some implementations, the search module 312 determines result scores for state records 400 identified during the search. The result score associated with a state record 400 may indicate the relevance of the state record 400 to the search query 100. A higher result score may indicate that the state record 400 is more relevant to the search query 100. The search module 212 generates the search results 130 based on the identified state records 400 and the result scores thereof.

Figure 4:
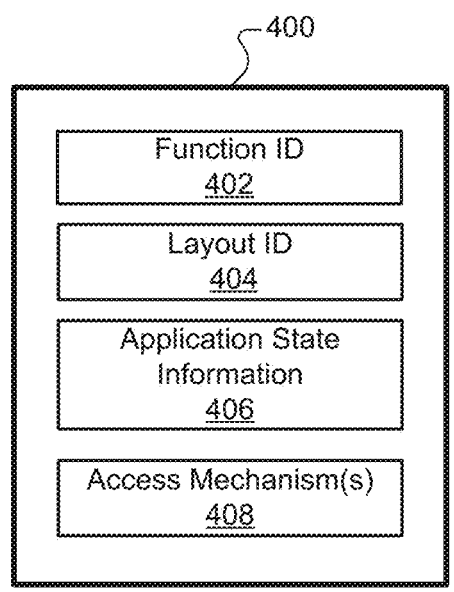
FIG. 4 is a schematic view illustrating an example of an application state record.

The application state datastore 322 includes a plurality of different state records 400. FIG. 4 illustrates an example state record 400. Each state record 400 may include data related to a function of an application and/or the state of the application resulting from performance of the function. In some implementations, a state record 400 includes a function identifier (ID) 402, a layout ID 404, application state information 406, and one or more access mechanisms 408 used to access functionality provided by an application. The application state datastore 322 may include one or more databases, indices (e.g., inverted indices), tables, files, or other data structures which may be used to implement the techniques of the present disclosure.

The function ID 402 may be used to identify the state record 400 among the other state records included in the application state datastore 322. The function ID 402 may be a string of alphabetic, numeric, and/or symbolic characters (e.g., punctuation marks) that uniquely identify the state record 400 in which the function ID 402 is included. In some examples, the function ID 402 may describe a function and/or an application state in human readable form. For example, the function ID 402 may include the name of the application referenced in the access mechanism(s) 408. Additionally, or alternatively, the function ID 402 may be a human readable string that describes a function performed according to the access mechanism(s) 408 and/or an application state resulting from performance of the function according to the access mechanism(s) 408. For example, if the state record 400 describes a function or state of an example application, XYX native application, the function ID 402 may include the name "XYZ" along with a description of the application state described in the application state information 406. In some implementations, the function ID 402 may include a string in the format of a uniform resource locator (URL) of a web access mechanism for the state record 400, which may uniquely identify the state record 400. In an example where the function ID 402 includes a string in the format of a URL, the function ID 402 may include the following string "http://www.xyz.com/this-is-the-example-state" to uniquely identify the state record 400. In other examples, the function ID 402 may include a URL using a namespace other than "http://," such as "func://," which may indicate that the URL is being used as a function ID 402 in a state record 400. For example, the function ID 402 may include the following string: "func://www.xyz.com/biz/this-is-the-example-state."

The layout ID 404 indicates the layout file 160 that the user device 200 is to use to render a user selectable link. The layout ID 404 may be a string of letters, numbers, or symbols. As the layout files 160 may be application specific, one than one state record 400 may share the same layout ID 404.

A state record 400 further includes one or more access mechanisms 408. The access mechanism(s) 408 may include one or more application access mechanisms, one or more web access mechanisms, and one or more application download addresses. The user device 200 may use the one or more application access mechanisms and the one or more web access mechanisms to access the same, or similar, functionality of the native/web application referenced in the application state information 406. For example, the user device 200 may use the different access mechanism(s) 408 to retrieve similar information, play the same song, or play the same movie. The application download addresses may indicate locations where the native applications referenced in the application access mechanisms can be downloaded.

The application state information 406 may include data that describes an application state into which an application is set according to the access mechanism(s) 408 in the state record 400. Additionally, or alternatively, the application state information 406 may include data that describes the function performed according to the access mechanism(s) 408 included in the state record 400. The application state information 406 may include a variety of different types of data. For example, the application state information 406 may include structured, semi-structured, and/or unstructured data.

In some implementations, the application state information 406 may include the content 192 that is provided in a result object 140. The content corresponds to the data provided by an application when the application is set in the application state defined by the access mechanism(s) 408 defined in the state record 400. For example, if one of the access mechanism(s) 408 is an application access mechanism 408, the application state information 406 may include data that describes a state of the native application after the user device 200 has performed the one or more operations indicated in the application access mechanism. In one example, if the state record 400 is associated with a shopping application, the application state information 406 may include data that describes products (e.g., names, ratings, and prices) that are shown when the shopping application is set to the application state defined by the access mechanism(s) 408. In some scenarios, the application state information 406 includes an address to an application server 190 where the user device 200 can request the content 192 via the application's API.

The types of data included in the application state information 406 may depend on type of information associated with the application state and the functionality defined by the access mechanism(s) 408. For example, if the state record 400 is for an application that provides reviews of restaurants, the application state information 406 may include information (e.g., text and numbers) related to a restaurant, such as a category of the restaurant, reviews of the restaurant (e.g., textual reviews and/or a star rating), and a price rating of the restaurant.

Figure 5:
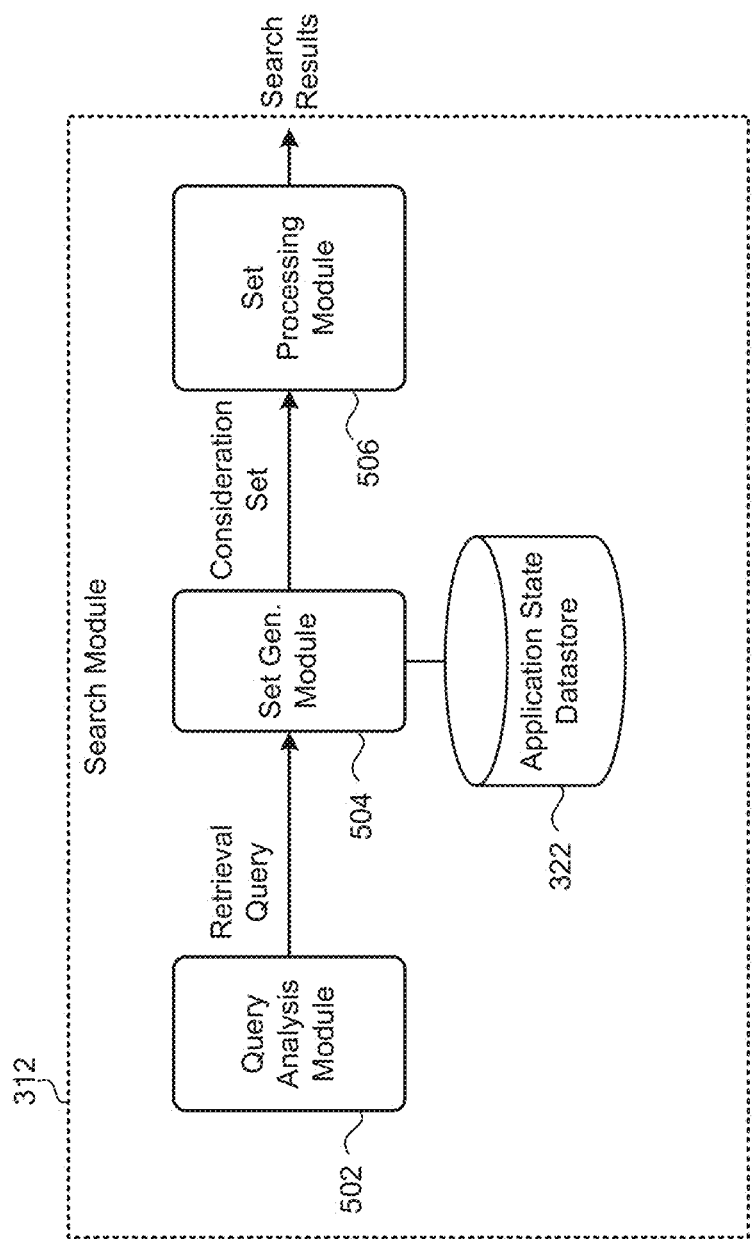
FIG. 5 is a schematic view illustrating example components of a search module.

Referring now to FIG. 5, an example implementation of the search module 312 is illustrated. The search module 312 can include a query analysis module 502, a consideration set generation module 504 (hereinafter "set generation module"), and a results processing module 506. The search module 312 may include additional or alternative components not discussed.

The query analysis module 502 receives a search query 100, and in some implementations, content parameters. The query analysis module 502 analyzes the received search query 100 and/or context parameters. For example, the query analysis module 502 may perform various analysis operations on the received search query 100. Example analysis operations may include, but are not limited to, tokenization of the search query 100, filtering of the search query 100, stemming, synonymization, and stop word removal. In some implementations, the query analysis module 502 outputs tokens representing the search query 100.

The set generation module 504 identifies a consideration set of state records 400 based on the received search query 100. The consideration set of state records may refer to the state records 400 that are scored by the set processing module 506. As used herein, the term consideration set can refer to a list of function IDs 402 of identified state records 400 or the actual records themselves. In some examples, the set generation module 504 may identify the state records 400 based on matches between terms of the search query 100 and terms in the state records 400. For example, the set generation module 504 may identify the state records 400 based on matches between tokens generated by the query analysis module 502 and words included in the state records 400, such as words included in the application state information and/or function. In some implementations, the set generation module 504 utilizes the tokens output by the query analysis module 502 as input to identify the consideration set. For example, the set generation module 504 may utilize the Lucene libraries to identify the consideration set and obtain the initial scores thereof.

The set processing module 506 scores the state records 400 in the consideration set in order to generate a set of search results 130. The scores associated with the state records may be referred to as "result scores." The set processing module 506 may determine a result score for each of the state records identified the consideration set. The result scores associated with a state record may indicate the relative rank of the state record 400 (e.g., the access mechanisms among other state records 400. For example, a larger result score may indicate that a state record is more relevant to the received search query 100. The information conveyed by the search results 130 may depend on how the result scores are calculated by the set processing module 506. For example, the result scores may indicate the relevance of an application function or application state to the search query 100, the popularity of an application function or state, or other properties of the application function or state, depending on what parameters the set processing module 506 uses to score the state records 400.

The set processing module 506 may generate result scores for state records 400 in a variety of different ways. In some implementations, the set processing module 506 generates a result score for a state record 400 based on one or more scoring features. The scoring features may be associated with the state record 400 and/or the search query 100. A state record 400 scoring feature (hereinafter "record scoring feature") may be based on any data associated with a state record 400. For example, record scoring features may be based on any data included in the application state information of the state record 400. Example record scoring features may be based on metrics associated with a person, place, or thing described in the state record 400. Example metrics may include the popularity of a place described in the state record and/or ratings (e.g., user ratings) of the place described in the state record 400. In one example, if the state record 400 describes a song, a metric may be based on the popularity of the song described in the state record 400 and/or ratings (e.g., user ratings) of the song described in the state record 400. The record scoring features may also be based on measurements associated with the state record 400, such as how often the state record 400 is retrieved during a search and how often access mechanisms of the state record 400 are selected by a user when appearing in the search results 130. Record scoring features may also be based on whether the state record 400 includes an application access mechanism that leads to a default state or a deeper native application state.

A query scoring feature may include any data associated with the search query 100. For example, query scoring features may include, but are not limited to, a number of words in the search query 100, the popularity of the search query 100, and the expected frequency of the words in the search query 100. A record-query scoring feature may include any data generated based on data associated with both the state record 400 and the search query 100 that resulted in identification of the state record 400 by the set generation module 504. For example, record-query scoring features may include, but are not limited to, parameters that indicate how well the terms of the search query 100 match the terms of the application state information of the identified state record 400 (e.g., the initial score assigned to the state record by the set generation module 504).

The set processing module 506 may generate a result score for a state record based on at least one of the record scoring features, the query scoring features, and the record-query scoring features. The set processing module 506 may determine a result score based on one or more of the scoring features listed herein and/or additional scoring features not explicitly listed. In some examples, the set processing module 506 may include one or more machine learned models (e.g., a supervised learning model) configured to receive one or more scoring features. The one or more machine learned models may generate result scores based on at least one of the record scoring features, the query scoring features, and the record-query scoring features. For example, the set processing module 506 may pair the search query 100 with each state record 400 and calculate a vector of features for each (query, record) pair. The vector of features may include one or more record scoring features, one or more query scoring features, and one or more record-query scoring features. The set processing module 506 may then input the vector of features into a machine-learned regression model to calculate a result score for the state record 400. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores associated with the state records 400 (e.g., access mechanisms) may be used in a variety of different ways. The set processing module 506 may rank and/or filter the state records 400 identified in the consideration set based on the result scores associated with the state records 400. In these examples, a larger result score may indicate that the state record 400 (e.g., the function or application state described in the state record 400) is more relevant than state rate record 400 having a lesser result score. In examples where the user device 200 displays the displayed search results 150 as a list, the user device 200 may display the user selectable links 152 corresponding to state records 400 having larger result scores nearer to the top of the results list e.g., near to the top of the screen). In some implementations, the set processing module 506 can remove any records from the consideration set that do not have a sufficient result score (e.g., the result score of the records is too low, or the number of state records 400 having a greater result score exceeds a threshold).

After the state records 400 in the consideration set of records have been scored, ranked, and/or filtered, the set processing module 506 can generate the search results 130 based on at least a subset of the state records 400. For each of the remaining state records 400, the set processing module 506 generates a result object 140 based on the state record 400. The set processing module 506 can include the layout ID 404 in the result object 140 as well as result data 146. In some scenarios, the result data 146 may be content 192 stored in the state record 400 (e.g., an icon, a description, textual data). In other scenarios, the result data 146 may include an address where the user device (e.g., the search application 214) can obtain the content 192.

For example, the result data 146 may indicate an address of an application server 190 corresponding to the state record 400. The user device 200 can request the content 192 from the application server 190 using the address contained in the result data 146. The set processing module 506 may further include one or more access mechanisms 408 indicated in the state record 400 in the result object 140. The resultant result objects 140 are communicated to the user device 200 in the search results 130.

Referring back to FIG. 3, the layout update module 314 provides layout files 160 to user devices 200 and manages the layout file datastore 324. The layout file datastore 324 stores layout files 160 corresponding to different applications. Each application may have one or more layout files corresponding thereto. An application provider can provide customized layout files 160 to the search engine 300. In some scenarios, the application provider can also indicate the types of states or functionalities that the new layout file 160 corresponds to. In this way, the application providers can update the look and feel of the displayed search results 150 when their respective applications are indicated in the search results 130. The layout update module 314 can assign a layout ID 404 to the layout file 160 and can update any implicated state records 400 with the new layout ID 404. Furthermore, the layout update module 314 can provide the new layout files 160 to one or more user devices 200. For example, the layout update module 314 can push the new layout files 160 to the user devices 200 when the user device 200 initiates a new search session or when the search application 214 is updated.

Figure 6:
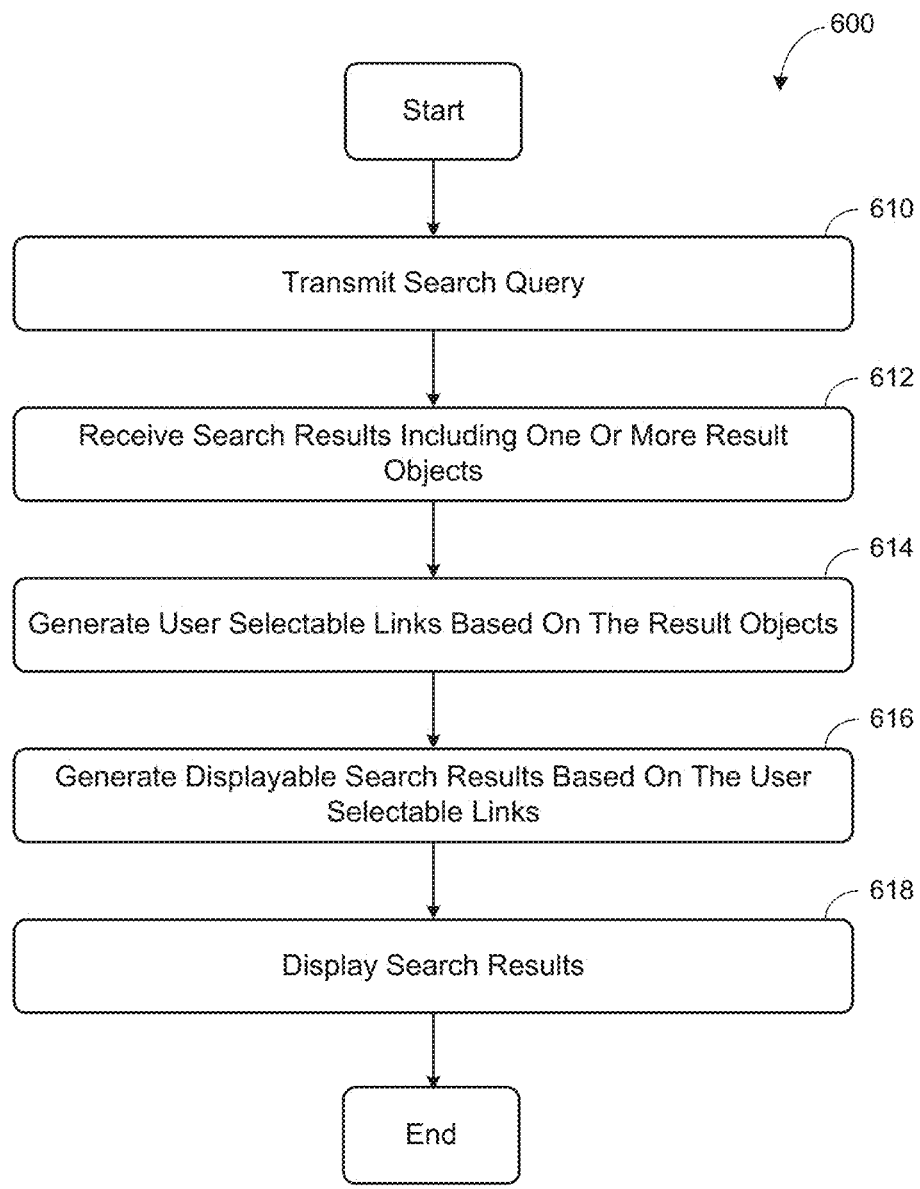
FIG. 6 is a flow chart illustrating an example set of operations for generating displayed search results.

FIG. 6 illustrates an example set of operations of a method 600 for displaying search results on a user device 200. For purposes of explanation only, the method 600 is explained as being performed by the search application 214 being executed by the processing device 210 of the user device 200.

At 610, the search application 214 transmits a search query 100 to the search engine 300. The search engine 300 may package the search query 100 in a query wrapper along with one or more context parameters. At 612, the search application 214 receives search results 130 from the search engine 300. The search results 130 include one or more result objects 140.

Figure 7:
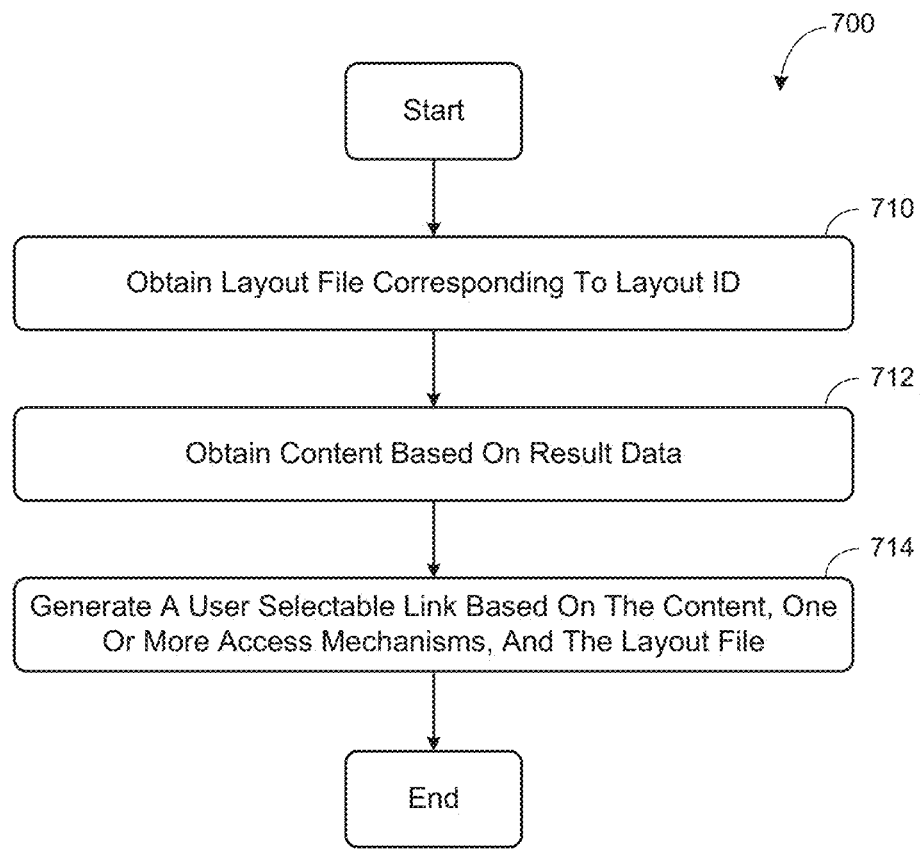
FIG. 7 is a flow chart illustrating an example set of operations for generating a user selectable link.

At 614, the search application 214 generates user selectable links 152 based on the result objects 140. FIG. 7 illustrates an example set of operations of a method 700 for generating a user selectable link 152 based on a result object 140. At 710, the search application 214 obtains a layout file 160 based on the result object 140. The search application 214 can parse the result object 140 to identify the layout ID 404 contained in the result object 140. The search application 214 can retrieve a layout file 160 from the storage device 220 using the layout ID. At 712, the search application 214 obtains the content based on the result data 146 contained in the result object 140. In some scenarios, the result data 146 contains the content 192. In such a scenario, the search application 214 parses the result object 140 to identify the content 192. In other scenarios, the result object 140 contains an address where the search application 214 can identify the content. In such a scenario, the search application 214 requests the content 192 from the resource (e.g., application server 190) pointed to by the address. At 714, the search application 214 generates the user selectable link 152 based on the access mechanism(s) 408 contained in the result object 140, the content 192, and the layout file 160.

In some implementations, the search application 214 instantiates an instance of the layout object 162 and binds the content 192 and the application access mechanism(s) to the instantiated layout object to obtain the user selectable link 152.

Referring back to FIG. 6, at 616, the search application 214 generates the displayable search results 150 based on the user selectable links 152. The search application 214 can combine the user selectable links 152 with any other GUI elements that the search application 214 generates (e.g., headers corresponding to applications, borders, effects, etc). The result is the displayed search results 150. At 618, the search application 214 displays the displayed search results 150 via the user interface 240.

The methods of FIGS. 6 and 7 are provided for example. The ordering of the operations is not necessarily mandatory and some operations may be performed in parallel. Variations of the methods are within the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
transmitting, by a processing device of a user device, a search query to a search engine;
receiving, by the processing device, search results containing one or more result objects, wherein each result object of the one or more result objects includes a layout identifier, an access mechanism used to access a state of a respective application, and result data;
for each result object of the one or more result objects:
retrieving, by the processing device, a layout file of a plurality of layout files from a storage device of the user device based on the layout identifier of the result object, wherein the layout file corresponds to the respective application and defines a template that is used to generate a user-selectable link corresponding to the respective application;
parsing, by the processing device, the result data of the result object to identify an address corresponding to a third party resource corresponding to the respective application;
sending, by the processing device, a request for content to the identified address corresponding to the third party resource;
receiving, by the processing device, the content from the third party resource; and
generating, by the processing device, the user-selectable link based on the access mechanism of the result object, the layout file, and the content, wherein the generated user-selectable link includes the content received from the third party resource corresponding to the respective application;
generating, by the processing device, displayable search results using the generated user-selectable links; and
providing, by the processing device, the displayable search results for display.

2. The method of claim 1, wherein the layout files are custom layout files provided by application providers.

3. The method of claim 2, wherein an application provider provides a layout file with application data of a respective application.

4. The method of claim 2, wherein an application provider provides a layout file to a search engine, which provides the layout file before providing the search results.

5. The method of claim 1, wherein the layout files include a layout object and a binding.

6. The method of claim 5, wherein generating the user-selectable link includes:
instantiating an instance of the layout object; and
binding the content and the access mechanisms to the layout object using the binding.

7. The method of claim 1, wherein the address defines an application programming interface call to the third party resource.

8. A user device comprising:
a user interface;
a storage device storing a plurality of layout files;
a processing device that executes computer readable instructions, wherein the computer readable instructions, when executed by the processing device, cause the processing device to:
transmit a search query to a search engine;
receive search results containing one or more result objects from the search engine, wherein each result object of the one or more result objects includes a layout identifier, an access mechanism used to access a state of a respective application, and result data;
for each result object of the one or more result objects:
retrieve a layout file from the storage device based on the layout identifier of the result object, wherein the layout file defines a template that is used to generate a user-selectable link and corresponds to the respective application;
parse the result data of the result object to identify an address corresponding to a third party resource corresponding to the respective application;
send a request for content to the identified address corresponding to the third party resource;
receive the content from the third party resource; and
generate the user-selectable link based on the access mechanism of the result object, the layout file, and the content, wherein the generated user-selectable link includes the content received from the third party resource corresponding to the respective application;
generate displayable search results using the generated user-selectable links; and
output the displayable search results to the user interface.

9. The user device of claim 8, wherein the layout files are custom layout files provided by application providers.

10. The user device of claim 9, wherein an application provider provides a layout file with application data of a respective application.

11. The user device of claim 9, wherein an application provider provides a layout file to a search engine, which provides the layout file before providing the search results.

12. The user device of claim 8, wherein the layout files include a layout object and a binding.

13. The user device of claim 12, wherein generating the user-selectable link includes:
instantiating an instance of the layout object; and
binding the content and the access mechanisms to the layout object using the binding.

14. The user device of claim 8, wherein obtaining the content includes parsing the result object to identify the content.

15. The user device of claim 8, wherein the address defines an application programming interface call to the third party resource.

* * * * *